(12) United States Patent
Pasach

(10) Patent No.: US 7,086,218 B1
(45) Date of Patent: Aug. 8, 2006

(54) LINKED RING STRUCTURES

(75) Inventor: Lloyd Frank Pasach, Sunnyside, NY (US)

(73) Assignee: M & J - R & R Grosbard, Inc., New York, NY (US)

( * ) Notice: Subject to any disclaimer, the term of this patent is extended or adjusted under 35 U.S.C. 154(b) by 0 days.

(21) Appl. No.: 11/207,035

(22) Filed: Aug. 18, 2005

(51) Int. Cl.
*F16G 13/00* (2006.01)
*B21L 17/00* (2006.01)

(52) U.S. Cl. ............. 59/78; 59/91; 59/80; 29/896.412; 63/15; 63/15.5

(58) Field of Classification Search .................... 59/78, 59/91, 80; 63/15; 29/896.412
See application file for complete search history.

(56) References Cited

U.S. PATENT DOCUMENTS

| | | | | |
|---|---|---|---|---|
| 1,983,348 A | * | 12/1934 | Dieges | 63/15.7 |
| 2,902,749 A | * | 9/1959 | Manne | 29/896.412 |
| 3,263,444 A | * | 8/1966 | Di Croce | 63/15.7 |
| 3,465,543 A | * | 9/1969 | Baker | 63/15.5 |
| 3,639,995 A | * | 2/1972 | Gardner | 33/514.1 |
| 4,274,461 A | * | 6/1981 | Yamamoto | 29/522.1 |
| 4,317,264 A | * | 3/1982 | Bogner et al. | 63/15 |

* cited by examiner

*Primary Examiner*—David Jones
(74) *Attorney, Agent, or Firm*—James V. Costigan; Hedman & Costigan P.C.

(57) ABSTRACT

An articulated ring, such as a finger ring is based on a cast linkable connector element and a cast open connector link element having hooked ends which are fitted to posts provide on said cast linkable connector element The invention also includes a novel method of making an articulated ring structure which is based on the steps of:

(a) providing a plurality of cast linkable connector elements having a top layer and a bottom layer with the top layer and said bottom layer connected by two posts;
(b) providing a plurality of cast connector link elements with two ends, with a hook at each of said ends, and each hook adapted to engage a post on the cast linkable connector; and
(c) engaging each hook of each of the plurality of cast connector link elements with a post of two different cast linkable connector elements to form an articulated ring structure.

10 Claims, 4 Drawing Sheets

LINKED RING STRUCTURES

BACKGROUND OF THE INVENTION

In the prior art, two types of linked metal or articulated rings such as finger rings are known. The first and probably oldest type is simply a form of chain or chain mail made small enough for the finger and is capable of flexing on all three axes, These rings are made by bending and soldering wire into various kinds of intersecting loops. The second type flexes on only two axes and in this respect resembles a common steel watch band or a caterpillar type tractor tread. For convenience, this type of construction will be referred to as an "articulated band".

Articulated bands have been known at least since the beginning of the twentieth century and initially were made by a method of manufacture that required a skilled machinist with a hand lathe using links that were fabricated directly from tubular stock An alternate method involves the creation of model links via traditional jewelers techniques (carving of wax originals or filing of metal stock) then molding the resulting pieces in rubber for wax injection and casting using the lost wax process. In either case the pieces were joined together by drilling a hole through the link parts and soldering a wire or pin into place to hold the link segments together.

The "articulated bands" are still being made by the lathing method. The lathes are CNC (computer controlled) for greater efficiency and accuracy. Tubular precious metal stock is precision drilled for the pins. Then the CNC machine cuts out an entire set of links from the drilled metal tubular stock. The pins are then inserted and soldered together. Because the stock is drilled before the links are cut out, a precise alignment of the links is assured. This method has a drawback in that it results in the formation of gaps between the links which are sized according to the size of the milling machine tool head used to cut them apart. The prior art technique is illustrated in FIG. 4 where three links are aligned and drilled prior to the insertion of a pin. This procedure is repeated seriatim until the desired size is reached and the links are joined end to end to form the ring. Each link has the same dimensions which limits the ability to size the ring in conformance with standard ring sizing specifications. In addition, the drilling must be precisely controlled to provide for precise pin placement. Drill and pin techniques which could be utilized to achieve close tolerances between links have not been attempted due to prohibitive cost concerns. Even the current method of CNC production is far more expensive than our method because it produces great amounts of wasted materials e.g. precious metals such as gold, platinum and the like and requires skilled operators at the production level.

It has always been a problem to make an articulated band that exactly matches a common series of finger sizes. If a ring design is to have a fixed number of links; and the links are to be of the same size and of the same curvature for esthetic reasons, then each unique ring size requires a link model of the appropriate scale. There are at least ten common ring sizes and many more exceptional ones. This is not a problem with watch bands for instance because watch bands are provided with various kinds of adjustments. If rings are made using this technique, the cost of a separate model using a fixed articulated band design makes the availability of a collection of articulated band rings too expensive for mass manufacturing and distribution. The present invention combines CAD, stereolithography output models, a unique linking mechanism and conventional lost wax casting technology to make "articulated bands" that may be easily produced in multiple models and multiple ring sizes for a mass market. In addition, it allows a closer fit of the link units which produces esthetic improvements as well because the precise and closely spaced links provide an difference appearance as compared to widely spaced or irregularly spaced links.

SUMMARY OF INVENTION

The present invention comprises a novel structure and a novel method of manufacturing novel articulated rings in general and finger rings in particular. The novel articulated rings of the invention comprise cast links having pins which are an integral part of the casting rather than pins which are inserted and soldered into place afterward. This concept means that the articulated rings may be assembled with very close tolerances without the need to have skilled artisans position and drill holes for the insertion of pins. The precision of the spacing and the size of the spaces between articulated parts is a characteristic of the novel articulated bands of the invention. The articulated rings of the invention comprise two elements or more preferably three elements: a cast linkable connector element, a cast open connector link element and an optional wedge shaped element adapted to close said cast open connector link element.

Accordingly, it is an object of the invention to provide a novel articulated ring structure and a novel process of making said ring structure which avoids the need for precision drilling and pin insertion.

It is also an object of the invention to provide a novel articulated ring where the adjoining ring segments are closely spaced apart using exact tolerances without regard to the size of the ring.

It is also an object of the invention to provide a ring structure having proportionately sized cast links for each size in which the ring is made.

These and other objects of the invention will become apparent from the appended specification. As used herein and in the appended claims, the terms cast and casting are used to include any process that involves the melting of materials and the subsequent solidification without regard to the nature of the material.

DETAILED DESCRIPTION OF THE INVENTION

Figure 1:
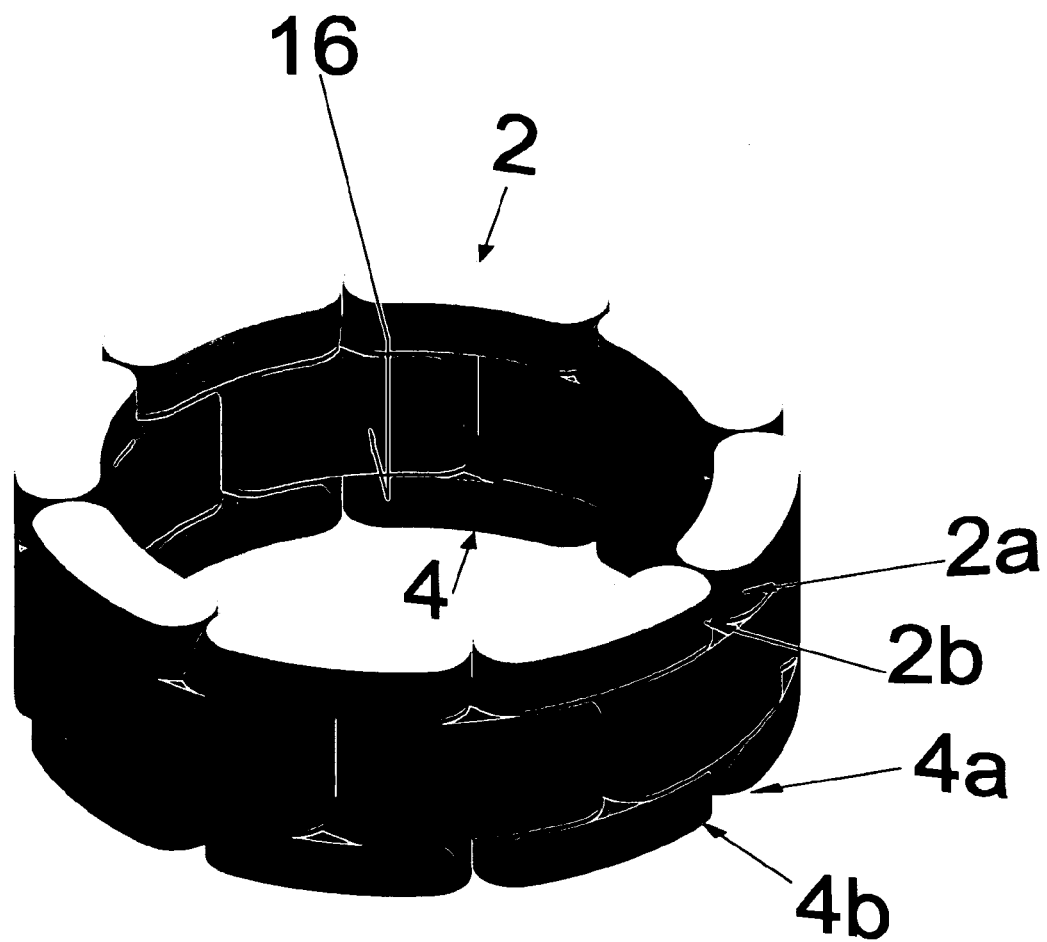
FIG. 1 is a top perspective view of an articulated ring according to the invention.
Figure 3:
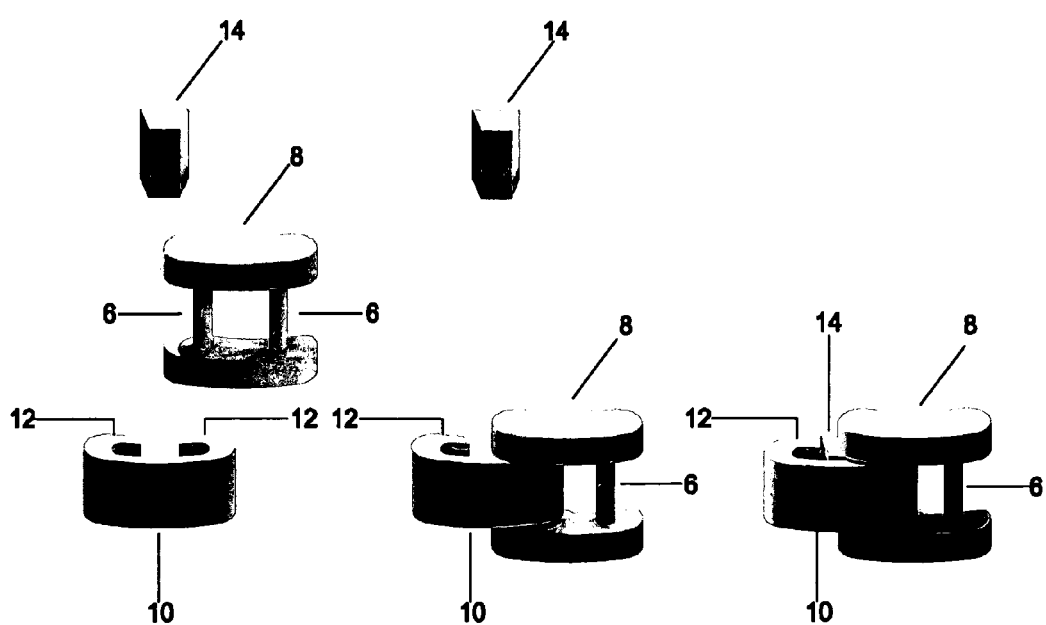
FIG. 3 shows the individual molded parts of the articulated rings of the invention and the sequence of steps used to assemble the rings of the invention.

The present invention may be utilized to make articulated ring structures in general such as necklaces, watchbands, bracelets and articulated finger, thumb or toe rings in particular. The preferred material is metal, i.e. precious metal such as gold or platinum but other metals or thermoplastics or thermosets may be used to make articulated rings structures. As shown in the embodiment of FIG. 1, the articulated ring of the invention has three stacked layers. The top layer 2 and bottom layer 4 comprise a plurality of cast linkable connector 8 where the top layer 2 and bottom layer 4 of the articulated rings are connected to one another with rounded connecting posts that are not shown in FIG. 1 but are shown in FIG. 3 as posts 6 which are a part of the linkable connector casting 8. The cast linkable connector comprises a top layer 2; a bottom layer 4 and two molded in place posts 6 that connect the top layer 2 and the bottom layer 4 as shown in FIG. 3. The middle layer 5, comprises a plurality of cast connector links 10 as shown in FIG. 3, having a hook like ends 12 as shown in FIG. 3 that engage the rounded connecting posts 6 as shown in FIG. 3. The hook like ends 12 oppose one another because they have a curved profile and have ends that are positioned to define a recessed slot that is adapted to engage posts 6 on two separate cast connector links to hold said cast linkable connectors to one another while allowing for articulated movement between the cast linkable connector 8 and the cast connector links 10 around a portion of posts 6. The amount of articulated movement is restricted by the ring like structure that is formed when a plurality of the cast connector links 10 are attached to a plurality of cast linkable connectors 8 to form a circular structure as shown in FIG. 1.

The wedge shaped element 14 is preferably used to connect the hooked ends of cast connector link 10 but if desired the hooked ends 12 of cast connector link 10 may be left unconnected.

The wedge shaped element 14 is preferably made by casting and is shown in FIG. 3 as an element that is adapted to be fastened onto the cast connector link 10 as a means for connecting the hook like ends 12. Hook like ends 12 are connected to one another one another by the wedge shaped element 14 in order to form a closed cast connector 16 as shown in FIG. 1, having a smooth profile. The wedge shaped element 14 is formed of the same or a different material that is used to make the cast connector link 10. The wedge shaped element 14 is preferably made by casting but optionally may be made by other techniques such as by stamping using an appropriate die. In a preferred embodiment the articulated rings of the invention are formed of metal, e.g. a precious metal such as gold or silver and the wedge shaped element 14 is soldered in place on the cast connector link 10 using an appropriate solder that will have the same color as the connector link casting 10. After the wedge shaped element 14 is soldered in place, any rough surfaces are smoothed by means of conventional polishing techniques. If plastics are used to make rings according to the invention, plastics such as polystyrene, polycarbonate or nylon etc. may be used.

Figure 2:
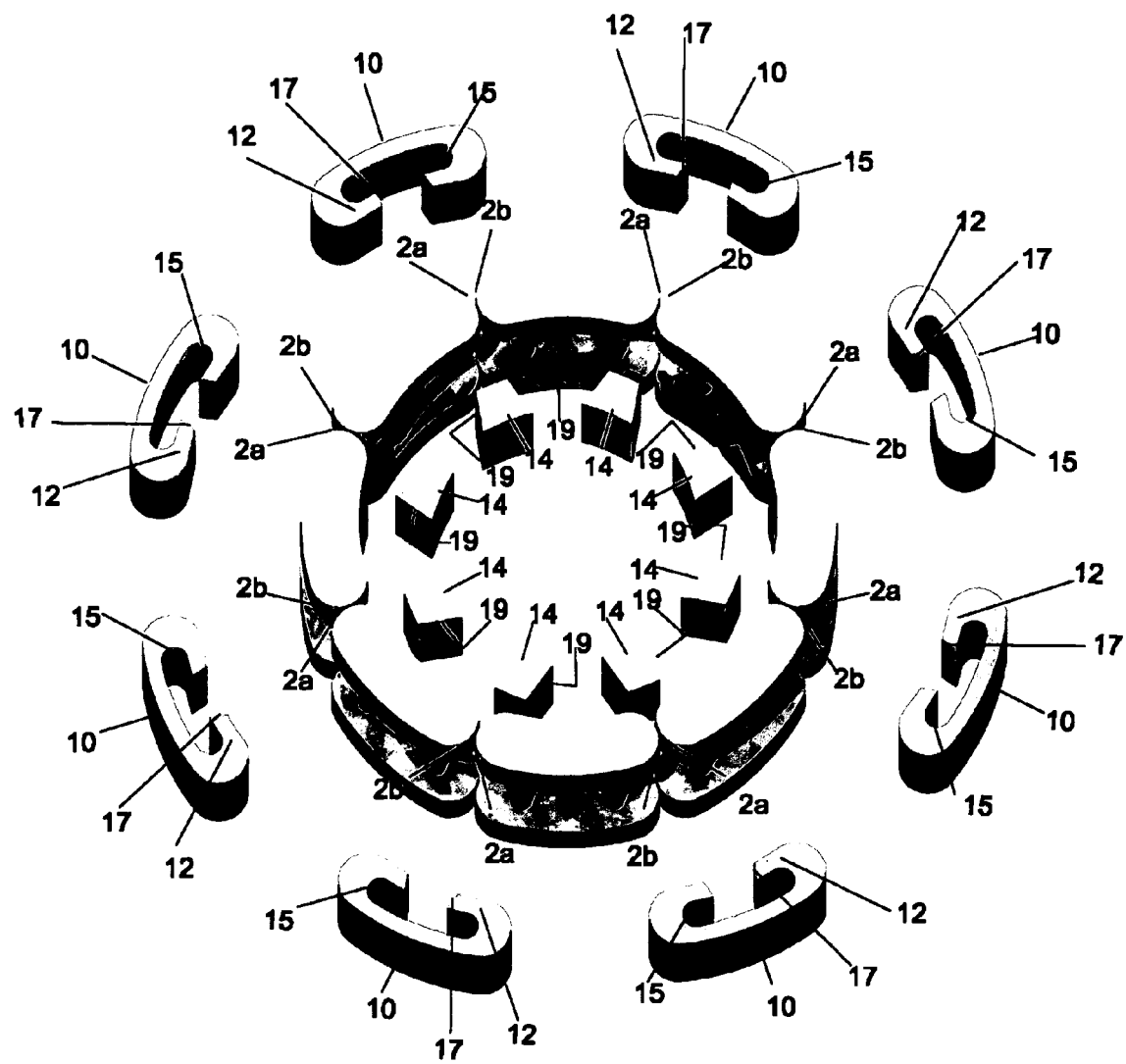
FIG. 2 is an exploded view of an articulated ring of the invention which shows the several component parts.

FIG. 2 shows an exploded view of the cast linkable connectors 8, the cast connector links 10 and the wedge shaped elements 14 for connecting the hooks 12 of the cast connector links 10. Beveled shaped hook ends 17 have a bevel which compliments the beveled side 19 of the wedge shaped element to ensure a close fit and smooth surface after the wedge shaped links are fastened in place by an appropriate technique such as soldering. The cast connector links are placed on a post of one cast connector link at a time to allow for sliding the connector into place before inserting a post of a second cast linkable connector into the hook end of said cast connector link.

The casting of the parts for making the ring is carried out by conventional casting procedures, preferably by the lost wax technique for casting metallic articles. The dimensions of the parts may be determined by determining the size of the articulated ring and the number of connector link castings 10 that are desired for the particular design. An example of the sizes of the parts required for making a size 10 ring having eight connector castings is as follow: the dimension of the connector link castings 10 are 8.65×4.3 mm; the arc of the connector link casting is 45°; the opening for the posts is 1.02 mm and the hooks are extended 3.186 mm from the end of the connector link casting 10. The length of the linkable connector casting 8 is 8.65 mm; the diameter of the posts is 1 mm; the height of the posts is 4.31 mm; the arc is 45° and the posts are located 1.704 mm from the ends of the linkable connector casting 8, substantially in the middle of the linkable connector casting 8, as determined across the narrowest dimension. The preferred wedge shaped element has a trapezoidal profile and measures 2.506 mm×4.3 mm on its back face and 1.65 mm by 4.3 mm on its front face and is 2.02 mm thick. In making other ring sizes, the dimensions will be adjusted accordingly as will the dimensions be adjusted when thinner or thicker or differently shaped linkable connector castings and/or connector link castings are selected for making an articulated ring according to the invention.

The articulated ring of the invention may be assembled by sliding each hooked end 12 of a connector link casting 10 onto a different post 6 of a different linkable connector casting 8 as shown in FIG. 3. Each hook 12 slides onto a post 6 of a different linkable connector casting 8. Generally, the linkable connector casting 8 and the plurality of connector link castings 8. together by hand like a puzzle and then older the back onto the link as in FIG. 1 drawing B.

The design of the articulated rings permits the formation of very closely fitted articulated segments. The spacing of the ends 2a and 2b of the individuals elements of top layer 2 and of the corresponding bottom layer ends 4a and 4b may be 0.05 mm, and even more preferably a space of 0.075 to 0.007 mm may be provided which gives a different appearance and esthetic quality that was not possible with the above described prior art manufacturing technique which is illustrated in FIG. 4.

Figure 4:
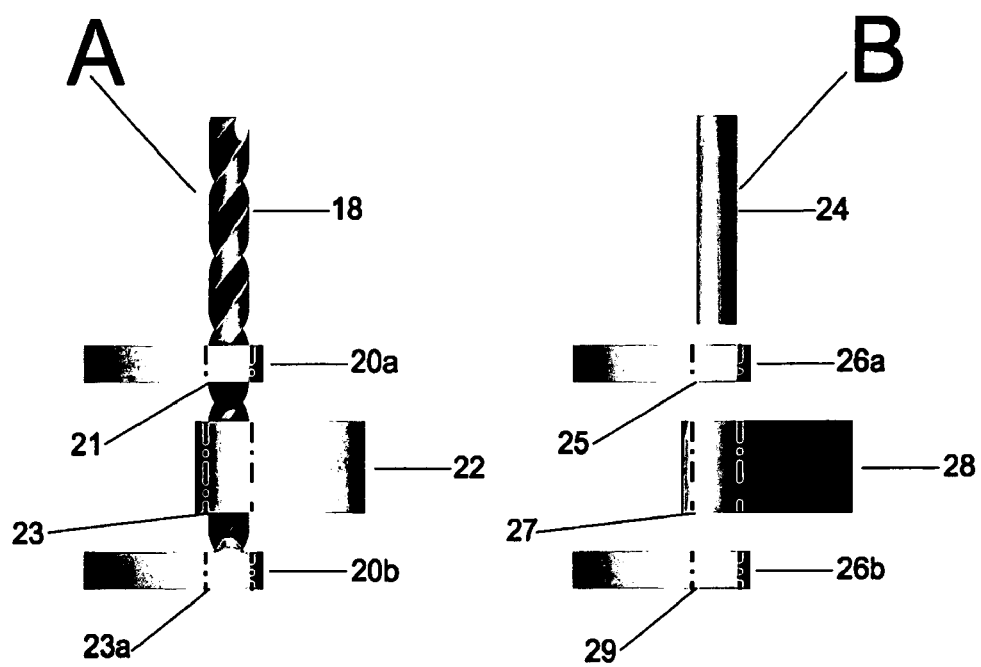
FIG. 4 is a schematic of the steps used in the prior art to fabricate and assemble prior art articulated rings.

In FIG. 4, drill bit 18 is shown in the drilling position where it is carefully aligned in link 20a where hole 21 is shown in phantom by dotted lines and in link 22 where hole 23 is shown in phantom by dotted line and in link 20b where hole 23a is shown in phantom by dotted lines in assembly A. Assembly B shows the exploded view of the final assembly of the element made by drilling Assembly A, where pin 24 is to be passed through link 26a by means of hole 25 (shown by dotted lines in a phantom view) and through link 28 by means of hole 27 (shown in a phantom view by dotted lines) and finally through link 26b by means of hole 29 (shown in phantom by dotted lines).

The creation of one of the articulated ring of the invention begins with a conventional CAD drawing that prepares a drawing of the links describe above. Each different finger ring size is then created via CAD by simple scaling of the CAD file and saved as separate files, one for each ring size. The CAD files are outputted as high resolution stereolithography. The resulting stereolithography output is then molded via low temperature silicone molds (RTV) and reproduced from these molds via conventional lost wax method or alternatively, special castable stereolithography resins may be cast directly into silver and the resulting silver becomes a master for vulcanized molds and reproduction via the standard lost wax process.

The correct number of link components are then cast in the desired material such as a precious metal, e.g. platinum, gold and the like. The sprues are removed and the components of the ring are pre-polished by conventional means. The components are asembled by sliding the parts together like a puzzle as described above.

The backs are soldered onto the open links thereby closing them prior to final polishing.

I claim:

1. An articulated ring comprising a combination of a first element which is a cast linkable connector element and a second element being a cast open connector link element having hooked ends, said ring having a wedge shaped element adapted to close said open connector link element by connecting said hooked ends.

2. An articulated ring as defined in claim 1 wherein said linkable cast connector element comprises a top layer and a bottom layer, said top layer and said bottom layer being connected by two posts which are sized to engage the hooked ends of said cast open connector link element.

3. An articulated ring as defined in claim 1 wherein said posts are sized to allow for movement of the cast linkable connector element relative to the cast connector link element.

4. An articulated ring as defined in claim 1 wherein said wedge shaped element linkable cast connector element comprises an element having a trapezoidal cross-section.

5. An articulated ring as defined in claim 4 herein said articulated ring is a finger ring made of a precious metal.

6. An articulated ring as defined in claim 5 wherein said finger ring has said wedge shaped element soldered to said hooked ends.

7. A method of making an articulated ring structure, said method comprising:
   (a) providing a plurality of cast linkable connector elements having a top layer and a bottom layer, said top layer and said bottom layer being connected by two posts;
   (b) providing a plurality of cast connector link elements having two ends, with a hook at each of said ends, and each hook adapted to engage a post on said cast linkable connector; and
   (c) engaging each hook of each of said plurality of cast connector link elements with a post of two different cast linkable connector elements to form an articulated ring structure.

8. A method as defined in claim 7 wherein said articulated ring structure has a wedge shaped element which connects the ends of said hooks on each cast connector links.

9. A method as defined in claim 8 wherein said articulated ring structure is a finger ring.

10. A method as defined in claim 9 wherein said finger ring structure is made of a precious metal.

* * * * *